United States Patent Office 3,186,867
Patented June 1, 1965

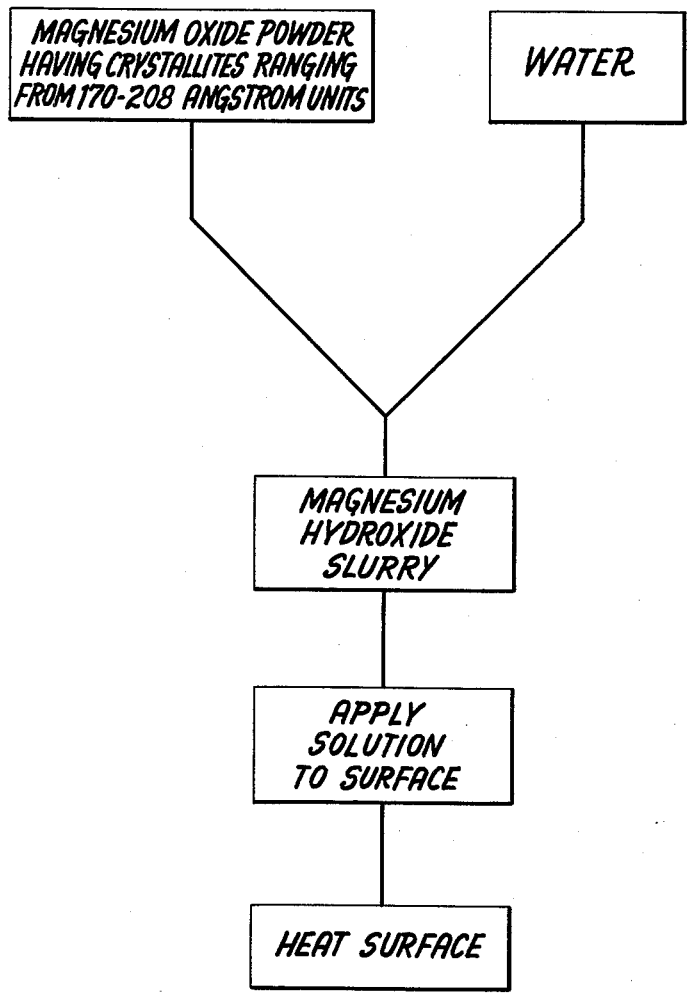

3,186,867
PROCESS FOR COATING FERROUS MATERIAL AND MATERIAL COATED BY SUCH PROCESS
Herbert B. Forslund, Williamstown, and Robert G. Hirst, Pittsfield, Mass., assignors to General Electric Company, a corporation of New York
Filed Oct. 12, 1962, Ser. No. 230,219
4 Claims. (Cl. 117—127)

This invention relates to coatings for ferrous material and, more particularly, to a process for coating ferrous material, and the material coated by such process.

In many fields of use and, in particular, in the electrical industry, it is necessary to provide a coating on ferrous material. This coating desirably performs the functions of insulating, separating and purifying the ferrous material as discussed below. For example, in the transformer art, the cores of the transformers are usually formed of a ferrous material, such as, for example, silicon steel, which may be provided with a preferred grain growth orientation to provide optimum electrical and magnetic properties. It has been found necessary to provide a coating on each of the various layers of ferrous material in the core. This coating will perform three separate functions. The first function of the coating is to provide separation of the various turns or layers of the material, for example, when used in cores, to prevent their sticking or welding together during high temperature anneals. A second function is that of aiding in the chemical purification of the ferrous material to develop the desired optimum magnetic characteristics of such material. The third function of the coating is to form on the surface of the ferrous material an insulation which will have sufficient electrical strength to provide for the electrical insulation of one layer of ferrous material from the next, for example, during its use as a core in a transformer.

In the present state of the electrical apparatus art, the most widely used coating for the ferrous material which is used as the magnetic core of the electrical apparatus is a coating of magnesium oxide and/or magnesium hydroxide. These coatings are, in general, applied to the ferrous material in the form of a suspension of magnesium hydroxide in water. The suspension comprises a quantity of magnesium oxide in water and is mixed sufficiently for the desired application, the magnesium oxide being hydrated to an extent dependent on the character of the oxide used. The term "magnesium hydroxide slurry" as used throughout the remainder of this specification and claims will mean a suspension of magnesium hydroxide in water, and including magnesium oxide which has not hydrated, in the suspension. Further, the term "magnesium hydroxide coating" will be considered to mean a coating which may also include unhydrated magnesium oxide.

In the use of ferrous material, especially silicon steel, for the magnetic cores of transformers, the steel is generally annealed first to provide a grain growth anneal which develops the optimum magnetic properties of the silicon steel. This anneal is usually carried out at a temperature ranging from approximately 950 to 1200° C. This anneal also aids in purifying the steel, aided by the coating placed on the steel. After the magnetic core has been formed, a stress relief anneal is provided to relieve the stresses which have developed in the silicon steel of the magnetic core due to the mechanical working of the steel in formation of such core. These stress relief anneals are generally carried out at a temperature of approximately 840° C.

A more economical method of manufacture has been developed in which the grain growth anneal of the silicon steel is deferred until after the core has been formed. In this method it is then possible to provide both a grain-growth anneal and a stress-relief anneal at the same time. A suitable temperature of approximately 1150° C. is used, under proper atmospheric conditions, to provide this dual anneal. However, as will be understood, in either instance it is necessary to provide an interlaminar separator to prevent the sticking or welding of the turns during the anneal, as well as to provide the other two functions as hereinbefore noted.

As will be well understood, where the grain growth anneal is provided prior to the formation of the magnetic core, the coating, which is placed on the steel before the anneal, will be hardened by the anneal. However, where the grain growth anneal is provided after the formation of the core, it will be apparent that the coating will not be in the hard form which is formed during the high temperature anneal. Therefore, in the formation of the core, the coating is more readily apt to flake and break off during the handling which is necessary in making the magnetic core.

As hereinbefore noted, the coating which is generally applied to ferrous material in the present state of the art is a coating of magnesium hydroxide which is applied in the form of a water slurry. The coating is then dried to leave a thin layer of coating material on the surface of the ferrous material. In the present state of the art it is not, in general, possible to provide a satisfactory coating on the surface of a ferrous material using a substantially pure magnesium hydroxide slurry. The substantially pure magnesium hydroxide slurry will not form a sufficiently adherent layer of coating material of proper thickness on the ferrous material to withstand the subsequent handling and bending of the coated ferrous material, for example, the bending necessary in the formation of a magnetic core. The coating, under such circumstances, has a great tendency to flake and drop off thus creating excessive dust during the formation of the core with its resulting problems to equipment and to the health of the workmen. Of course, such flaking also results in inferior interlaminar insulation after annealing.

A number of additives have been proposed to be added to the magnesium hydroxide slurry which would help the magnesium hydroxide to adhere to the surface of the ferrous material. However, it has been found that many of these additives create other problems. For example, many of these additives introduce additional carbon or other contaminants to the steel, thereby causing either higher initial losses or higher aging losses, or both such additional losses, when such material is used in magnetic cores for electrical magnetic apparatus. From the above it is obvious that there is a great need in the electrical industry for a coating material which will form a tenacious, adherent coating on ferrous material, such as silicon steel, while at the same time not detracting from the optimum magnetic characteristics of such silicon steel.

It is, therefore, one object of this invention to provide a tenacious coating on ferrous material comprised substantially of magnesium hydroxide; which coating will not detract from the magnetic properties of the ferrous material.

It is a further object of this invention to provide a process for coating ferrous material with a coating comprised substantially of magnesium hydroxide.

It is a further object of this invention to provide a magnesium hydroxide slurry which will firmly adhere to a ferrous material, in which the slurry is made from a special size of magnesium oxide.

It has recently been discovered that a substantially pure magnesium hydroxide coating can be applied to ferrous magnetic material when the magnesium hydroxide slurry is made from magnesium oxide powder having crystallites whose size falls within a very narrow range. The crystallite size of the powder is measured by X-ray diffraction and is expressed in angstrom units. A very tenacious, adherent coating of substantially pure magnesium hydroxide can be applied to ferrous magnetic material when the crystallite size of the starting magnesium oxide powder falls in a range of approximately 170–208 angstrom units. As used throughout this specification and claims, the term "crystallite" will be understood to mean very small crystals.

In carrying out this invention in one form, an adherent film of substantially pure magnesium hydroxide is provided on the surface of a strip of ferrous material by first providing a slurry comprising a suspension of magnesium hydroxide in water. The slurry is formed from magnesium oxide powder having a crystallite size ranging from approximately 170 to 208 angstrom units. The suspension is then applied to the surface of the ferrous material in any desired manner and then dried to remove any excess absorbed water. An adherent film comprised substantially of pure magnesium hydroxide will remain on the surface of the ferrous material.

The features of this invention which are believed to be novel are set forth with particularity in the appended claims. However, it is believed that the invention itself and the manner in which its objects are obtained, as well as other objects and advantages thereof, will be more fully understood by reference to the following detailed description thereof, when read in connection with the accompanying drawing. The drawing is a flow diagram illustrating one form of the process of this invention.

It has been discovered that unexpected, improved results may be obtained in magnesium hydroxide coatings for ferrous magnetic material when the slurry of magnesium hydroxide is formed from a magnesium oxide powder in which the crystallites of the powder are within the range of approximately 170 to 208 angstrom units. It has been found that a coating made from such slurry will very tenaciously adhere to ferrous magnetic material without necessity for any additive to the slurry to aid in adhering the coating to the ferrous magnetic material.

Many attempts have been made to determine an acceptable characteristic or property of magnesium oxide powder which would provide an indication of its utility in formation of magnesium hydroxide coating. It is generally well known that it is necessary to obtain substantially complete hydration of the powder in water suspension to obtain a slurry that will provide a good coating to ferrous magnetic material. However, many of the magnesium oxide powders that are substantially completely hydrated in a water suspension do not provide a good magnesium hydroxide coating.

Some manufacturers of magnesium oxide powders have used an "activity index" as a proper powder characteristic to classify various grades of magnesium oxide powder. In general, "activity index" is a measurement of surface area of the powder. However, this measurement of powder property does not necessarily bear a direct relationship to the crystallite size of the powder, nor does it provide any indication of the ability of the magnesium oxide powder to form a magnesium hydroxide slurry which will provide a good coating of magnesium hydroxide to ferrous magnetic material. For example, some powders which were used in slurries to provide magnesium hydroxide coatings had the following measured characteristics:

| Powder No. | Activity index | Crystallite size, A. |
|---|---|---|
| 1 | 95 | 171 |
| 2 | 90 | 175 |
| 3 | 80 | 171 |
| 4 | 90 | 231 |

All of the powders numbered 1, 2 and 3 when made into magnesium hydroxide slurries formed magnesium hydroxide coatings on ferrous magnetic material which adhered tightly to the ferrous material and cohered well to itself. The powder numbered 4 when made into a magnesium hydroxide slurry, formed a coating which would not cohere to itself and would not adhere to the ferrous magnetic material. Thus, it can be seen that the activity index does not provide any indication of either the crystallite size of the magnesium oxide powder, or of its ability to make a magnesium hydroxide slurry which would provide the desired magnesium hydroxide coating to ferrous magnetic material.

In making the magnesium hydroxide coatings of this invention a magnesium oxide powder having a crystallite size approximately in the range of 170 to 208 angstrom units is employed. In the preferred form of the invention, an aqueous suspension of magnesium hydroxide is prepared, using the above magnesium oxide powder. In forming the aqueous suspension or slurry approximately 5.5 to 8% by weight of the magnesium oxide powder is placed in water and thoroughly mixed until substantially complete hydration of the magnesium oxide is obtained. This provides a slurry of magnesium hydroxide.

If a suspension of less than approximately 5.5% by weight of magnesium oxide powder is used to form the slurry, the resultant coating does not provide a sufficient amount of magnesium hydroxide to the ferrous material. When the suspension contains more than approximately 8% by weight of magnesium oxide powder, the slurry becomes too difficult to process in the desired manner. If powder having a crystallite size below approximately 170 angstrom units is used the adhesion of the coating to the ferrous material is very poor although its cohesion is generally good. Above approximately 208 angstrom units both the cohesion and the adhesion of the coating is generally poor.

The resulting coating which is obtained by the above-noted mixture may be applied to the surface of a ferrous material in any desired manner, such as, for example, by roller coating on the material. This coating may be dried upon the sheet at a surface temperature of not more than approximately 135° C. If the drying is carried out above this temperature, there is a tendency for the coating to break down, leaving a spotty coating rather than the thin, even coat desired. After drying there remains on the surface a thin film of substantially magnesium hydroxide which has an excellent resistance to abrasions and which will permit 90° bending without flaking of the coating thereon. For example, a coating using powder 3 of the above table prepared in a slurry, was applied to a strip of silicon steel 0.012 inch thick. The coating obtained was approximately 0.02 to 0.03 ounce per square foot of steel and did not flake when subjected to 90° bending. After formation of a magnetic core from the silicon steel having been coated by the above suspension, the core may then be annealed, either a grain growth anneal in the range of approximately 950 to 1200° C., or a stress relief anneal of approximately 840° C., without damage to the coating and without sticking or welding of the various layers of silicon steel.

The invention herein described is very useful in providing a strong tenacious coating on ferrous material. The following table provides examples of the crystallite size of various magnesium oxide powders which were used to prepare magnesium hydroxide suspension. The slurries prepared from these powders were coated on silicon steel and dried, with the results indicated.

Table

| Powder No. | Crystallite size in angstrom units | Resulting coating |
|---|---|---|
| 5 | 225-231 | Good cohesion, poor adhesion. |
| 6 | 231-237 | Rubs off completely. |
| 7 | 243 | Do. |
| 8 | 224 | Do. |
| 9 | 190-200 | Very good cohesion and adhesion. |
| 10 | 134 | Poor adhesion, fair cohesion. |
| 11 | 119 | Do. |
| 12 | 114 | Poor adhesion and cohesion. |
| 13 | 134 | No adhesion, fair cohesion. |
| 14 | 284 | No adhesion or cohesion. |
| 15 | 294 | Poor adhesion and cohesion. |
| 16 | 188 | Very good adhesion and cohesion. |
| 17 | 175 | Do. |
| 18 | 71 | Poor adhesion, fair cohesion. |
| 19 | 170 | Very good adhesion and cohesion. |
| 20 | 187 | Do. |
| 21 | 186 | Do. |
| 22 | 208 | Do. |
| 23 | 203 | Do. |
| 24 | 193 | Do. |
| 25 | 231 | No adhesion or cohesion. |
| 26 | 235 | Do. |
| 27 | 225 | Do. |
| 28 | 259 | Do. |
| 29 | 144 | Poor adhesion, fair cohesion. |
| 30 | 430 | No adhesion or cohesion. |
| 31 | 115 | Poor adhesion, fair cohesion. |
| 32 | 406 | No adhesion or cohesion. |

From the above examples it will be clear that a magnesium hydroxide slurry prepared from a magnesium oxide powder having a crystallite size within the range of approximately 170 to 208 angstrom units provides a magnesium hydroxide coating on ferrous magnetic material that firmly adheres to the ferrous material and also strongly coheres to form a tight coating on such material. The scope of the invention set forth herein is defined in the appended claims.

What is claimed as new and which it is desired to secure by Letters Patent of the United States is:

1. A ferrous material having thereon a firmly adherent coating consisting essentially of magnesium hydroxide formed by application of a slurry consisting essentially of an aqueous suspension of approximately 5.5 to 8% by weight of a magnesium oxide powder, said powder having a crystallite size in the range of approximately 170 to 208 angstrom units, said coating being dried at a temperature not in excess of approximately 135° C.

2. A method of forming an adherent coating on the surface of ferrous material consisting of the steps of forming a slurry consisting essentially of an aqueous suspension of approximately 5.5 to 8% by weight of magnesium oxide powder, having a crystallite size in the range of approximately 170 to 208 angstrom units, applying said slurry to the surface of the ferrous material and then heating said surface to a temperature not in excess of approximately 135° C. to dry said slurry and leave on said surface a tenacious coating of magnesium hydroxide.

3. A ferrous material having on the surface thereof a firmly adherent coating of magnesium hydroxide formed by the application of a slurry consisting essentially of an aqueous suspension of a magnesium oxide powder having a crystallite size in the range of approximately 170 to 208 angstrom units, said coating being dried at a temperature not in excess of approximately 135° C.

4. A method of forming an adherent coating on the surface of a ferrous magnetic material consisting of the steps of forming a slurry consisting essentially of an aqueous suspension of magnesium oxide powder having a crystallite size in the range of approximately 170 to 208 angstrom units, applying said suspension to the surface of the ferrous material, and drying said suspension on the surface at a temperature not in excess of approximately 135° C.

References Cited by the Examiner

UNITED STATES PATENTS 2,909,454  10/59  Neish _____ 117—127

RICHARD D. NEVIUS, *Primary Examiner.*

WILLIAM D. MARTIN, *Examiner.*